(12) United States Patent
Serrarens et al.

(10) Patent No.: US 8,628,446 B2
(45) Date of Patent: Jan. 14, 2014

(54) TRANSMISSION MODULE FOR A VEHICLE

(75) Inventors: Alexander Fransicus Anita Serrarens, Waalre (NL); Roell Marie Van Druten, Eindhoven (NL); Bas Gerard Vroemen, Eindhoven (NL)

(73) Assignee: DTI Group, BV, Eindhoven (NL)

( * ) Notice: Subject to any disclaimer, the term of this patent is extended or adjusted under 35 U.S.C. 154(b) by 0 days.

(21) Appl. No.: 13/386,815

(22) PCT Filed: Jul. 24, 2010

(86) PCT No.: PCT/NL2010/050482
§ 371 (c)(1),
(2), (4) Date: Feb. 24, 2012

(87) PCT Pub. No.: WO2011/010928
PCT Pub. Date: Jan. 27, 2011

(65) Prior Publication Data
US 2012/0142479 A1 Jun. 7, 2012

(30) Foreign Application Priority Data

Jul. 24, 2009 (NL) .................................... 2003275
Dec. 15, 2009 (NL) .................................... 2003959

(51) Int. Cl.
*F16H 3/44* (2006.01)
(52) U.S. Cl.
USPC .......................................................... 475/302
(58) Field of Classification Search
USPC .................. 475/296, 297, 302, 317, 318, 320
See application file for complete search history.

(56) References Cited

U.S. PATENT DOCUMENTS

| 1,428,221 | A | * | 9/1922 | De Martino | .................. 475/207 |
| 5,628,703 | A | * | 5/1997 | Roeper | ..................... 475/159 |
| 7,597,644 | B2 | * | 10/2009 | Rodgers, II | ................... 475/218 |
| 7,604,561 | B2 | * | 10/2009 | Earhart | ......................... 475/218 |
| 7,798,931 | B2 | * | 9/2010 | Earhart | ......................... 475/207 |

FOREIGN PATENT DOCUMENTS

| DE | 3417504 | 11/1985 |
| EP | 1921349 | 5/2008 |
| FR | 2117555 | 6/1972 |
| WO | WO2006043812 | 4/2006 |
| WO | WO2007011211 | 1/2007 |

\* cited by examiner

*Primary Examiner* — David D Le
*Assistant Examiner* — David J Hlavka
(74) *Attorney, Agent, or Firm* — Eric Karich

(57) ABSTRACT

A transmission module 1 has an input 3 which can be connected to a drive source, and an output 5 which can be connected to a differential. The transmission module 1 further has a clutch 7 and an epicyclic gearing 21 with three rotational members, of which a first rotational member 23 is connected to the clutch housing 9, a second rotational member 25 is connected to a brake 27 and a third rotational member 29 is coupled to the output 5. A transmission 31 also forms part of the transmission module 1.

Between the clutch 7 and the epicyclic gearing 21 is located a partition 45 which is connected to the transmission housing 33 while a wet space 47 is formed between the partition and the transmission housing. The actuation cylinder 15 of the clutch, the operating cylinders 48 of the brake 27, as well as the oil pipes leading to it are fixed to the partition 45 as a result of which the actuation is arranged as a single module.

17 Claims, 5 Drawing Sheets

TRANSMISSION MODULE FOR A VEHICLE

FIELD OF THE INVENTION

The invention relates to a transmission module for a vehicle, having an input which can be connected to a drive source, and an output which can be connected to a differential, and comprising:
- a clutch comprising a first clutch portion connected to the input, which first clutch portion is formed by a clutch housing, and a second clutch portion which is formed by a clutch plate, as well as pressing means for pressing the two clutch portions together, which pressing means comprise a movable pressing element as well as an actuation cylinder connected thereto,
- an epicyclic gearing comprising at least three rotational members, of which a first rotational member is connected to the first clutch portion and a second rotational member is connected to a brake and a third rotational member is coupled to the output, and
- a transmission with a transmission housing and comprising an input shaft and an output shaft, the input shaft being connected to the second clutch portion and a gear wheel positioned on the output shaft forming the output.

The coupling of the third rotational member to the output may here also be effected via the transmission. In that case the third rotational member is thus connected to the input shaft of the transmission and the coupling to the output is then effected via the transmission.

STATE OF THE ART

A transmission module of this type is known from EP-A-1 625 037. In this known transmission module it is possible to install couplings and switches at various locations to reduce the number of gear reductions in the transmission without reducing the number of gears.

SUMMARY OF THE INVENTION

It is an object of the invention to improve and simplify the known transmission module. For this purpose, the transmission module according to the invention is characterised in that the transmission module comprises a partition which is connected to the transmission housing while a space is present between the partition and the transmission housing, which space is a substantially or completely wet space and the epicyclic gearing is present in this space. As a result, an oil-lubricated epicyclic gearing is possible so that it is possible to drive longer with the epicyclic gearing while the brake is closed. As a result, the gearing whose gear ratio equals that of the epicyclic gearing with a closed brake may be omitted in the transmission. In this transmission module also the brake is preferably a wet configuration so that it can be cooled better than a dry brake. However, it is also possible to have a dry brake configuration both on the left and on the right of the partition. The clutch may be both a dry plate clutch and a wet plate clutch and this may also be installed both on the left and on the right of the partition.

Preferably the first rotational member is connected to the clutch housing between the actuation cylinder and the input shaft of the transmission.

Between the first rotational member and the actuation cylinder there is preferably located a first sealing and between the first rotational member and the input shaft of the transmission there is preferably located a second sealing.

The actuation cylinder of the clutch is preferably connected to the partition. This partition is preferably located between the clutch housing and the epicyclic gearing. The clutch may be arranged as a dry clutch, so that when it is applied in vehicle designs with a dry clutch it need not be adjusted.

Furthermore, the transmission module preferably comprises an oil pipe or air pipe of which an end is connected to the actuation cylinder and which is also present in or on the partition. In consequence, the actuation of the clutch can be accommodated in one module. The operating cylinder or operating cylinders of the brake and the oil pipe or oil pipes leading up to it are preferably also located in or on the partition. The actuation of the brake can here be performed by an annular plunger or a plurality of disc-shaped plungers distributed over the periphery.

An embodiment of the transmission module according to the invention is characterised in that also the clutch is located in the wet space. As a result, a wet plate clutch may be used having all inherent advantages.

A further embodiment of the transmission module according to the invention is characterised in that the third rotational member is attached to a first gear wheel which is in engagement with a second gear wheel attached to the output shaft of the transmission, the first gear wheel being bearing-mounted on the first rotational member which in turn is bearing-mounted on the input shaft of the transmission. As a result, the radial bearing forces are not exerted on the partition so that the partition need not be strengthened in radial direction. However, the first gear wheel and/or the third rotational member may also be bearing-mounted direct on the transmission housing. Preferably the second gear wheel may be brought into direct engagement with a further gear wheel of the end transmission.

Still a further embodiment of the transmission module according to the invention is characterised in that the transmission comprises at least two gear reductions which each form a gear, while the third rotational member may optionally be coupled to one or more of these gear reductions. The transmission preferably has at least three gear reductions, so that with a transmission having no more than three gear reductions it is possible to realise five gears.

Preferably the first gear wheel of one of the gears is then fixedly attached to the input shaft and the first gear wheel of another gear can then freely rotate around the input shaft and optionally be coupled to the input shaft or to the third rotational member.

Furthermore, preferably the third rotational member can then be directly coupled to one or more of these gear reductions, or preferably the first gear wheel of the other gear can be directly coupled to the input shaft or directly coupled to the third rotational member.

Preferably the third rotational member can optionally be coupled to the first gear wheel of the lowest gear or the highest gear of the transmission.

Preferably the first gear wheel of the lowest gear is fixedly attached to the input shaft and the first gear wheel of the highest gear can freely rotate around the input shaft and may optionally be coupled to the input shaft or to the third rotational member. The first gear wheel of the highest gear can then preferably optionally be directly coupled to the input shaft or to the third rotational member.

Yet another embodiment of the transmission module according to the invention is characterised in that the third rotational member is connected to the input shaft via a freewheel bearing. This allows to save installing one actuator and, if the torque transfer is effected via this epicyclic gearing, makes the driving more comfortable when the accelerator is let go of. In addition, from this state it is easier to shift to a higher gear.

A further embodiment of the transmission module according to the invention is characterised in that the first gear wheel of one of the gears is fixedly attached to the input shaft and the first gear wheel of another gear can freely rotate around the input shaft and in that the third rotational member can optionally be coupled to the input shaft or the first gear wheel of the other gear. The third rotational member can then preferably be directly coupled to the input shaft or to the first gear wheel of the other gear.

Again a further embodiment of the transmission module according to the invention is characterised in that the first gear wheel of the lowest gear is fixedly attached to the input shaft and the first gear wheel of the highest gear can freely rotate around the input shaft and in that the third rotational member can optionally be coupled to the input shaft or to the first gear wheel of the highest gear. The third rotational member can then preferably be directly coupled to the input shaft or to the first gear wheel of the highest gear.

Yet again a further embodiment of the transmission module according to the invention is characterised in that the second gear wheel of the highest gear is fixedly attached to the output shaft and forms the output. If the first gear is left out (this is obtained by driving off via the epicyclic gearing in the second gear), the centre-to-centre distance between the input shaft and the output shaft of the transmission can be reduced as a result of which sufficient space is left for having the differential gear wheel run directly on the second gear wheel of the highest gear.

Furthermore, it is also possible to couple out the gear wheel present on the output shaft to a differential by means of the shaft itself. This is preferably the case with a rear-wheel-drive configuration where the transmission is oriented in longitudinal direction of the vehicle.

The stationary brake plates of the brake are preferably connected to the partition. Alternatively, in an advantageous embodiment the stationary brake plates of the brake may optionally be connected to the partition or to the transmission housing or to the first or third rotational member of the epicyclic gearing. The transmission module is in that case preferably provided with a selector switch which is configured such that with this selector switch the stationary brake plates of the brake may optionally be connected to one of two or more of the following parts: the partition, the transmission housing, the first rotational member of the epicyclic gearing and the third rotational member of the epicyclic gearing.

BRIEF DESCRIPTION OF THE DRAWINGS

The invention will be described below in more detail based on examples of embodiment of the transmission module according to the invention represented in the drawing figures, in which.

DETAILED DESCRIPTION OF THE DRAWINGS

Figure 1:
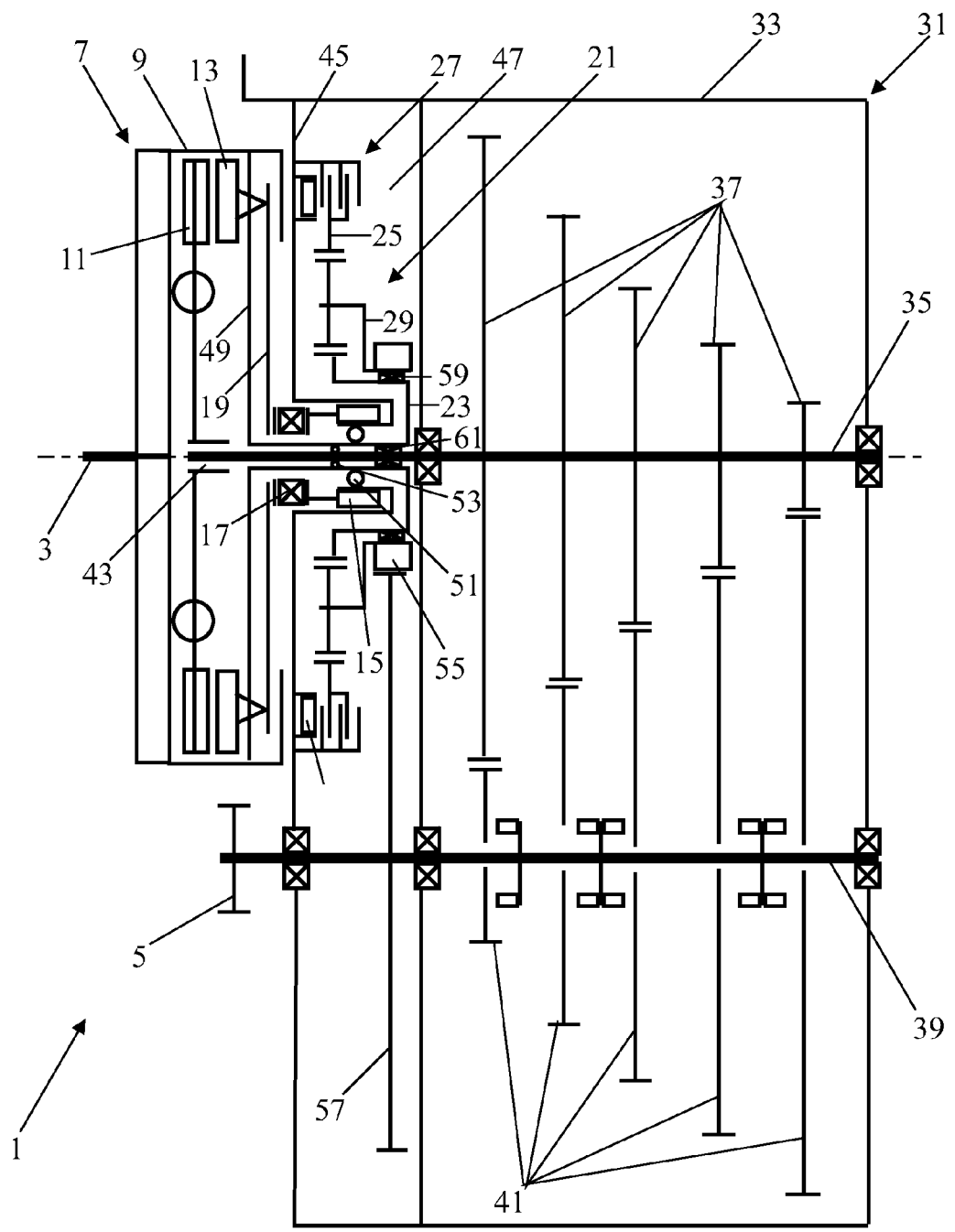
FIG. 1 gives a diagrammatic representation of a first embodiment of the transmission module according to the invention provided with a dry plate clutch.

FIG. 1 gives a diagrammatic representation of a first embodiment of the transmission module according to the invention. The transmission module 1 has an input 3 which may be connected to a drive source, and an output 5 which may be connected to a differential. The transmission module 1 further includes a clutch 7 comprising an input-connected first clutch section formed by a clutch housing 9, and a second clutch section formed by a clutch plate 11. The clutch further includes pressure means for pressing the two clutch sections together. These pressure means comprise a movable pressing element 13 as well as an actuation cyclinder 15 which is connected via an axial bearing 17 to an end of a lever 19. The other end of the lever is in contact with the annular pressing element 13.

Furthermore the transmission module 1 comprises an epicyclic gearing 21 which has three rotational members, of which a first rotational member 23 is connected to the clutch housing 9, a second rotational member 25 is connected to a brake 27 and a third rotational member 29 is coupled to the output 5. The first rotational member 23 in this embodiment is formed by the sun gear, the second rotational member 25 by the ring gear and the third rotational member 29 by the planet carrier. The brake 27 is arranged as a wet plate brake of which the stationary brake plates are connected to the partition 45.

A transmission 31 also forms part of the transmission module 1. This transmission comprises a transmission housing 33, an input shaft 35 with attached thereto first gear wheels 37, and an output shaft 39 with attached thereto second gear wheels 41 which are in engagement with the first gear wheels. From each gear reduction of first and second gear wheels which are in engagement with each other one of them is fixedly attached to the shaft (in this embodiment the first gear wheels) whereas the other ones (the second gear wheels) can freely rotate around the shaft and can be coupled thereto by means of a synchromesh or a claw clutch. The input shaft 35 is connected via a spline 43 to the clutch plate 11 and a gear wheel present on the output shaft 39 then forms the output 5.

A partition 45 which is connected to the transmission housing 33 is located between the clutch 7 and the epicyclic gearing 21. Between the partition and the transmission housing there is a wet space 47 which accommodates the epicyclic gearing 21. The actuation cylinder 15 of the clutch and the operating cylinders 48 of the brake 27 are attached to the partition 45 and the oil pipes leading to these cylinders are also attached to the partition.

The first rotational member 23 extends between the actuation cylinder 15 and the input shaft 35 of the transmission and is connected to the clutch housing 9 via a plate 49. A first sealing 51 is then present between the first rotational member 23 and the actuation cylinder 15 and a second sealing 53 is then present between the first rotational member 23 and the input shaft 35 of the transmission.

The third rotational member 29 is attached to a first gear wheel 55 which is in engagement with a second gear wheel 57 attached to the output shaft 39 of the transmission. The first gear wheel 55 is then bearing-mounted, via bearing 59, on the first rotational member 23 which in turn is bearing-mounted, via bearing 61, on the input shaft 35 of the transmission.

Figure 2:
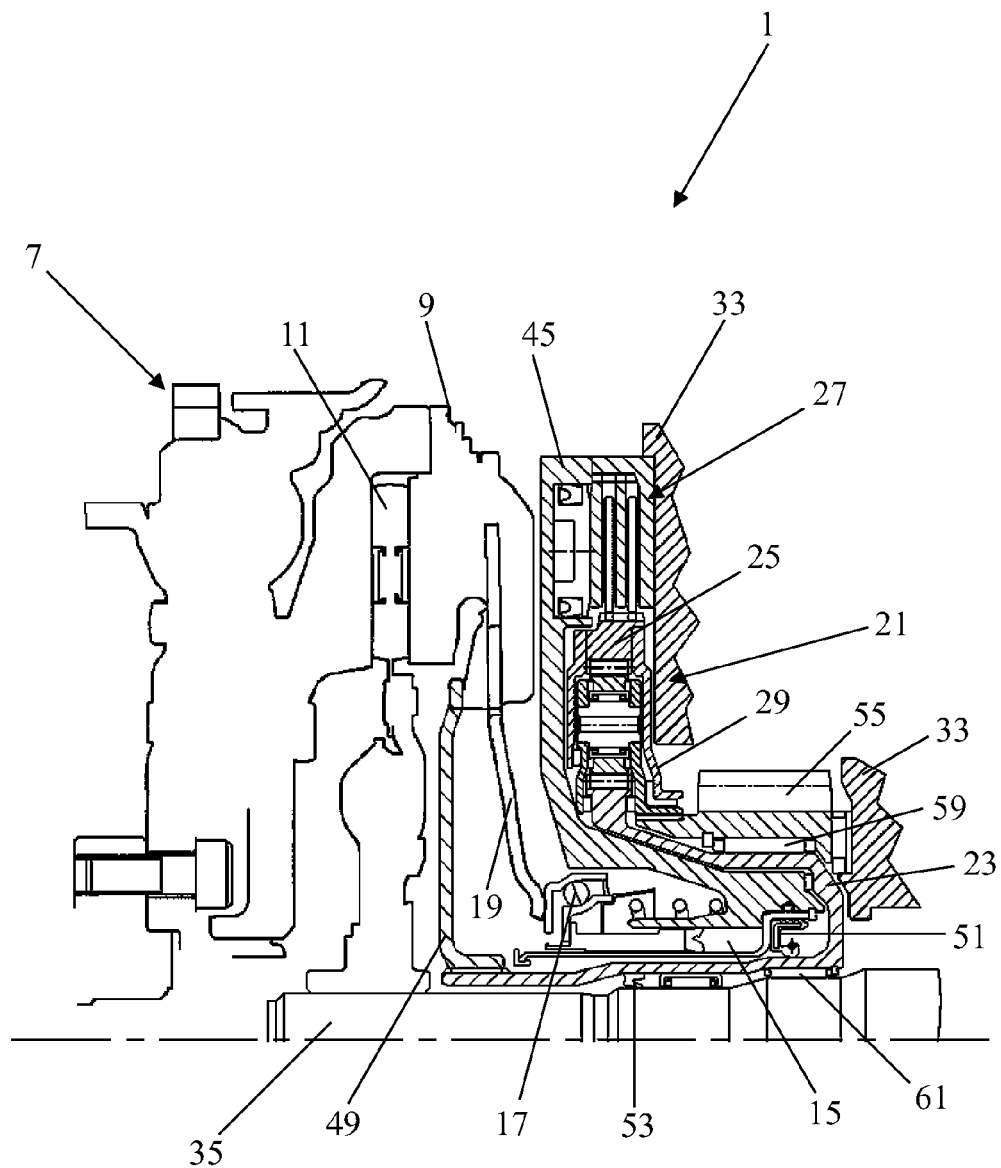
FIG. 2 shows a concrete embodiment of the transmission module diagrammatically represented in FIG. 1.

For illustrative purposes FIG. 2 shows a concrete embodiment of the transmission module diagrammatically represented in FIG. 1.

Figure 3:
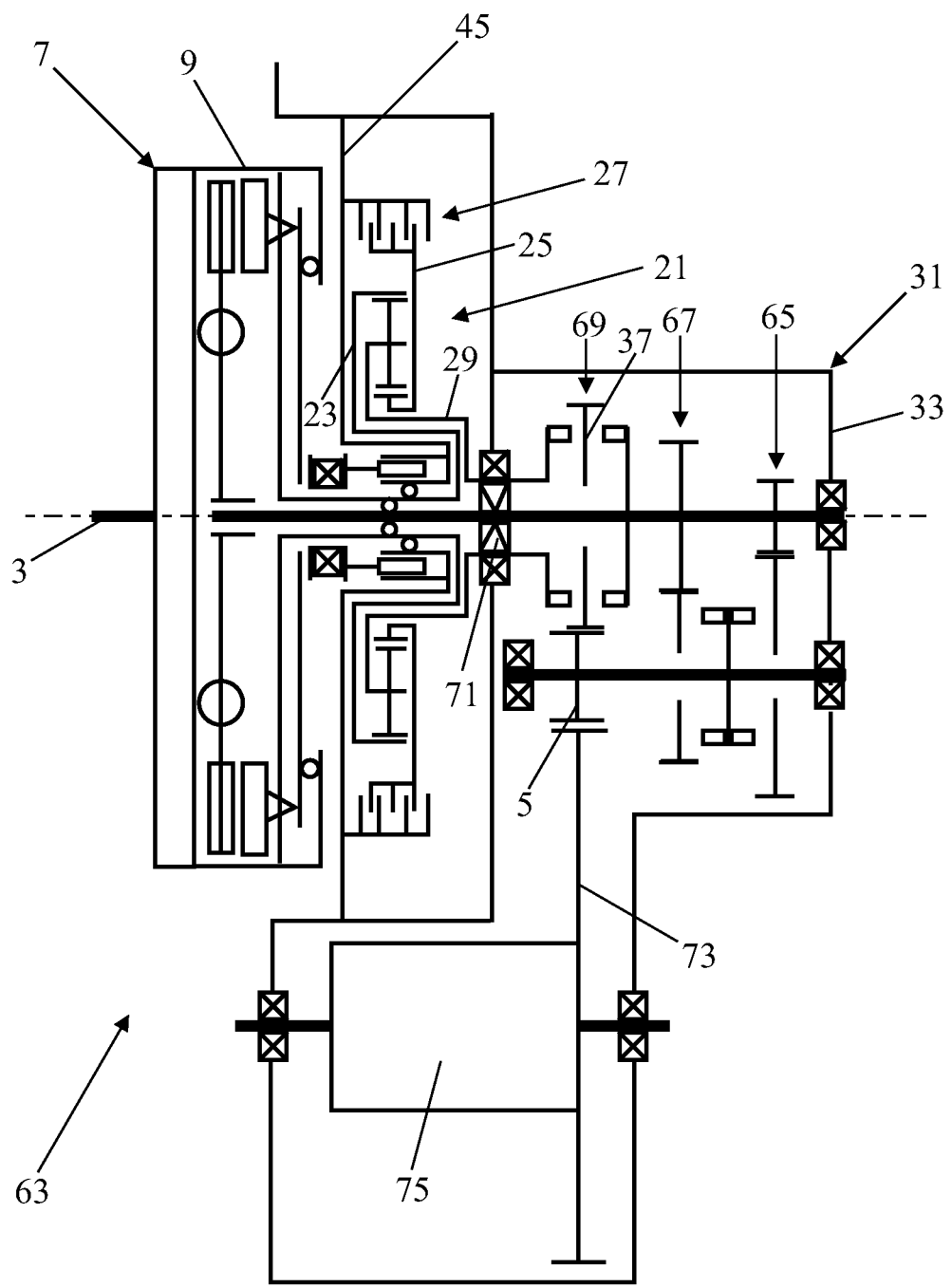
FIG. 3 gives a diagrammatic representation of a second embodiment of the transmission module according to the invention provided with a dry plate clutch.

FIG. 3 gives a diagrammatic representation of a second embodiment of the transmission module according to the invention. All parts similar to those of the first embodiment are referred to by like reference numerals. In this transmission module 63 the first rotational member 23 is formed by the ring gear, the second rotational member 25 is formed by the sun gear and the third rotational member 29 is formed by the planet carrier. The transmission 31 in this embodiment comprises three gear reductions 65, 67 and 69 which each form a gear. The third rotational member 29 can here optionally be coupled to the first gear wheel of the lowest gear 65 or to the first gear wheel of the highest gear 69.

The first gear wheel of the lowest gear 65 is fixedly attached to the input shaft 35; the coupling to the third rotational member 29 is effected by means of a freewheel bearing 71 which is located between the third rotational member and the input shaft 35. The first gear wheel of the highest gear 69 can freely rotate around the input shaft 35 and can optionally be coupled to the input shaft 35 or to the third rotational member 29. The second gear wheel of the highest gear 69 is then fixedly attached to the output shaft 39 and forms the output 5. As a consequence of the small distance between the input and output shafts 35 and 39 the gear wheel 73 of the differential 75 can be in direct engagement with the second gear wheel of the highest gear.

As a result of this construction it is possible to realise five speeds with no more than three gear reductions. The first gear is obtained by closing the brake 27 (and leaving the clutch 7 open) and coupling the second gear wheel of the lowest gear 65 to the output shaft 39 while the driving action is effected via the epicyclic gearing 71 and the lowest gear 65. The second gear is formed by the lowest gear 65. For this purpose, the brake 27 needs to be open and the clutch 7 closed. The third gear is obtained by closing the brake 27 (and again leaving the clutch 7 open) and coupling the third rotational member 29 to the first gear wheel of the highest gear 69. The fourth gear is obtained by closing the clutch 7 (and leaving the brake 27 open) and coupling the second gear wheel of the middle transmission 67 to the output shaft 39. Finally, the first gear is obtained by coupling the first gear wheel of the highest gear 69 to the input shaft 35 and closing the clutch 7 and leaving the brake 27 open.

With this transmission module 63 it is possible to shift between the first and second, second and third and third and fourth gear without interruption of the drive torque. This takes place in the following manner. The second gear wheel of the lowest gear (this is the second gear) is coupled to the output shaft 39. Subsequently, the brake 27 is closed (the clutch 7 continues to be open). Now it is possible to drive off in the first gear. Subsequently, the clutch 7 is closed and the brake 27 is opened. In consequence, without an interruption of the drive torque a shift to the second gear is made. Then the first gear wheel of the highest gear 69 (this is the fifth gear) is coupled to the third rotational member 29. By closing the brake 27 and opening the clutch 7 a shift to the third gear is made without interruption. Then the second gear wheel of the middle gear 67 (this is the fourth gear) is coupled to the output shaft 39. By closing the clutch 7 and opening the brake 27 a shift to the fourth gear is made without any interruption of the torque transfer. The shift to the fifth gear is made by opening the clutch 7, coupling the first gear wheel of the highest gear 69 to the input shaft 35 and then closing the clutch again. This is thus effected with an interruption of the drive torque.

Figure 4:
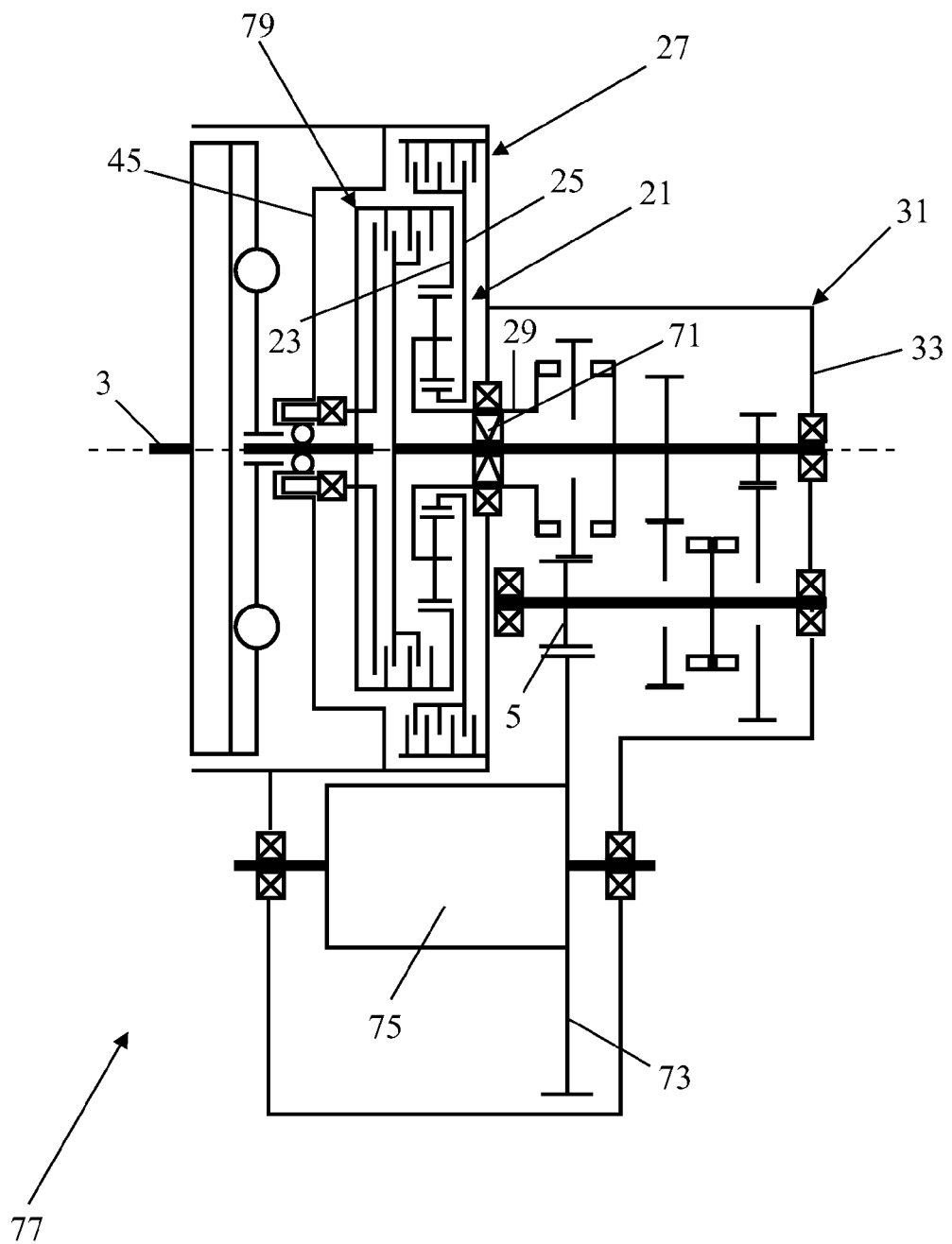
FIG. 4 gives a diagrammatic representation of a third embodiment of the transmission module according to the invention provided with a wet plate clutch.

FIG. 4 gives a diagrammatic representation of a third embodiment of the transmission module according to the invention. All parts similar to those of the second embodiment are referred to by like reference numerals. In this transmission module 77 also the clutch 79 is located in the wet space. The clutch is configured here as a wet multiple plate clutch.

Figure 5:
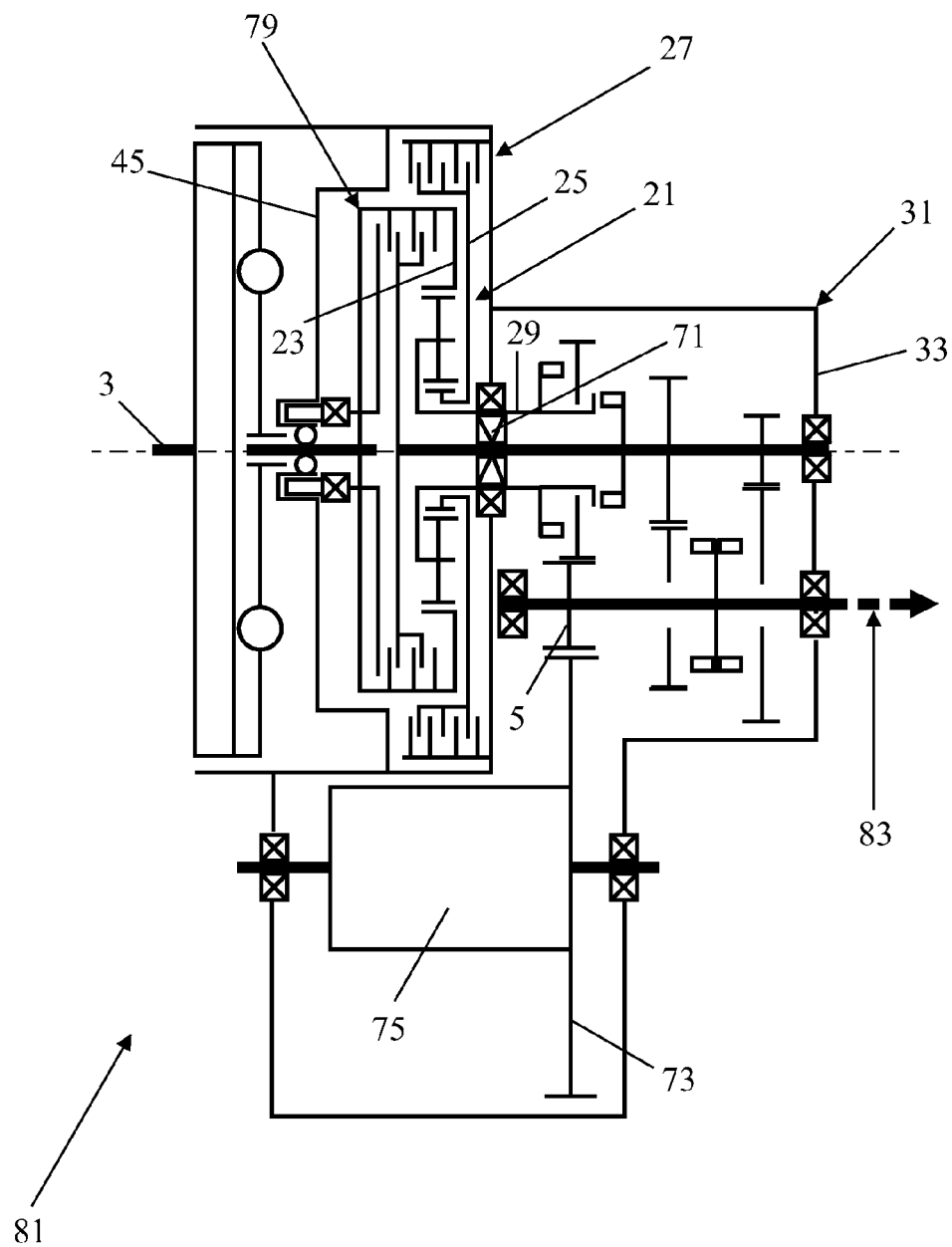
FIG. 5 gives a diagrammatic representation of a fourth embodiment of the transmission module according to the invention wherein the third rotational member can be coupled to the input shaft.

FIG. 5 gives a diagrammatic representation of a fourth embodiment of the transmission module according to the invention. All parts similar to those of the third embodiment are referred to by like reference numerals. In this transmission module 81 the third rotaional member can be directly coupled to the input shaft of the transmission. The output shaft of the transmission can also drive the rear wheels in lieu of or supplementary to the front wheels. This is shown in diagrammatic manner by arrow 83.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims. For example, the transmission module may also be provided with a selector switch (not shown) which has such configuration that via this switch the stationary brake plates of the brake can optionally be connected to one of two or more of the following parts: the partition, the transmission housing, the first rotational member of the epicyclic gearing and the third rotational member of the epicyclic gearing.

What is claimed is:

1. A transmission module for a vehicle, having an input which can be connected to a drive source, and an output which can be connected to a differential, and comprising:
    a clutch comprising a first clutch portion connected to the input, which first clutch portion is formed by a clutch housing, and a second clutch portion which is formed by a clutch plate, as well as means for pressing the two clutch portions together;
    an epicyclic gearing comprising at least three rotational members, of which a first rotational member is connected to the first clutch portion and a second rotational member is connected to a brake and a third rotational member is coupled to the output of the transmission module; and
    a transmission comprising at least two gear reductions which each form a gear, and comprising a transmission housing and an input shaft and an output shaft, the input shaft being connected to the second clutch portion and a gear wheel positioned on the output shaft forming the output,
    wherein the first gear wheel of one of the gears is fixedly attached to the input shaft and the first gear wheel of another gear can then freely rotate around the input shaft and wherein the third rotational member can optionally be coupled to the input shaft or the first gear wheel of the other gear and wherein the transmission module comprises a partition which is connected to the transmission housing while a space is present between the partition and the transmission housing, which space is a substantially or completely wet space and the epicyclic gearing is present in this space.

2. The transmission module of claim 1, wherein the first rotational member is connected to the clutch housing between the actuation cylinder and the input shaft of the transmission.

3. The transmission module of claim 1, wherein between the first rotational member and the actuation cylinder there is located a first sealing and between the first rotational member and the input shaft of the transmission there is located a second sealing.

4. The transmission module of claim 1, wherein the actuation cylinder of the clutch is connected to the partition.

5. The transmission module of claim 1, wherein the partition is located between the clutch housing and the epicyclic gearing.

6. The transmission module of claim 1, wherein the transmission module further comprises an oil pipe or air pipe of which an end is connected to the actuation cylinder and which is also present in or on the partition.

7. The transmission module of claim 1, wherein also the clutch is located in the wet space.

8. The transmission module of claim 1, wherein the third rotational member is attached to a first gear wheel which is in engagement with a second gear wheel attached to the output shaft of the transmission, the first gear wheel being bearing-mounted on the first rotational member which in turn is bearing-mounted on the input shaft of the transmission.

9. The transmission module of claim 1, wherein the second gear wheel may be brought into direct engagement with a further gear wheel of the end transmission.

10. The transmission module of claim 1, wherein the first gear wheel of one of the gears is fixedly attached to the input shaft and the first gear wheel of another gear can freely rotate around the input shaft and may optionally be coupled to the input shaft or to the third rotational member.

11. The transmission module of claim 1, wherein the third rotational member may optionally be coupled to the first gear wheel of the lowest or of the highest gear of the transmission.

12. The transmission module of claim 11, wherein the first gear wheel of the lowest gear is fixedly attached to the input shaft and the first gear wheel of the highest gear can freely rotate around the input shaft and may optionally be coupled to the input shaft or to the third rotational member.

13. The transmission module of claim 12, wherein the third rotational member is connected to the input shaft via a free-wheel bearing.

14. The transmission module of claim 1, wherein the first gear wheel of the lowest gear is fixedly attached to the input shaft and the first gear wheel of the highest gear can freely rotate around the input shaft and in that the third rotational member can optionally be coupled to the input shaft or to the first gear wheel of the highest gear.

15. The transmission module of claim 1, wherein the second gear wheel of the highest gear is fixedly attached to the output shaft and forms the output.

16. The transmission module of claim 1, wherein the stationary brake plates of the brake are connected to the partition.

17. The transmission module of claim 1, wherein the stationary brake plates of the brake may optionally be connected to the partition or to the transmission housing or to the first or third rotational member of the epicyclic gearing.

* * * * *